Patented June 19, 1951

2,557,786

UNITED STATES PATENT OFFICE 2,557,786

METHOD OF COATING A SILICEOUS BASE

Oscar Kenneth Johannson, Corning, N. Y., assignor to Corning Glass Works, Corning, N. Y., a corporation of New York No Drawing. Original application June 11, 1943, Serial No. 490,515. Divided and this application June 12, 1947, Serial No. 754,267

2 Claims. (Cl. 117—72)

This invention relates to coatings on solid or fibrous bodies and materials, and particularly to resinous coatings.

This application is a division of my copending application Serial Number 490,515, filed June 11, 1943, now Patent 2,436,304, and assigned to the assignee of the present invention.

It is often necessary and desirable to coat articles with resins. Such materials do not always adhere with sufficient tenacity to be satisfactory for the purpose in view because of the organophobic nature of the surfaces of the articles. For instance, objectionable separation of the laminations of laminated sheet glass sometimes occurs due to insufficient adhesion between the resin and the glass. The lacquer coatings on decorative glassware, such as Christmas tree ornaments and the like, are sometimes too easily rubbed off in handling or weakened by contact with water or moisture with consequent peeling of the coating from the glass.

The primary object of this invention is to provide an adherent overlying coating for base members.

A further object is to provide a method of applying adherent overlying coatings to base members.

Another object is to provide an improved method of applying adherent resinous coatings to base members.

Another object is to provide siliceous base members with adherent films which act as bonding agents for organic resins.

Another object is to provide a method for increasing the adhesion of organic resins to glass surfaces.

My invention is predicated upon my discovery that siliceous surfaces become organophilic when treated with organosilicon compounds comprising organosilicon halides, and that the adhesion of organic resins to the organophilic surfaces thus provided is substantially greater than it is for the original untreated surfaces.

By organosilicon halides I means derivatives of SiH₄ which contain halogens and organic radicals that are joined to the silicon atoms through carbon atoms. Examples of such organic radicals are as follows: aliphatic radicals such as methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, xenyl, etc.; naphthyl, mono- and poly- alkyl naphthyls as methyl naphthyl, diethyl naphthyl, tri-propyl naphthyl, etc.; tetra-hydronaphthyl, anthracyl, etc.; aralkyl such as benzyl, phenyl-ethyl, etc.; alkenyl such as methallyl, allyl, etc.; and heterocyclic radicals. The above organic radicals may also, if desired, contain inorganic substituents such as halogens, etc.

In the practice of my invention a primary coating is applied to the base member by contacting the latter with one or more of the aforesaid organosilicon halides as priming agents and thereafter a resin is applied to the treated surface of the base member.

The primary coat may be applied to the base member by dipping it or by spraying it with the liquid priming agent or its solution. Alternatively, the primary coat may be applied to the base member by exposing the latter to the vapors formed by heating or by blowing air or steam through the priming agent. The excess of primary coat may, if desired, be removed by washing and rinsing the reated surface with fresh solvent, although the presence of an excess is usually not objectionable. After the base member has thus been treated, a thin, invisible film, only a few molecules thick, will remain strongly adsorbed on the treated surface although the latter is repeatedly washed with fresh solvent.

I have found that the general effectiveness of the priming treatment and adherence of the film is improved if the base member is heated after the treatment at a temperature below the boiling point or decomposition temperature of the compound employed, particularly when it is an ester. Heating for a few minutes to an hour is sufficient. For reasons not understood, such heating does not destroy the invisible film but, on the contrary, seems to improve its stabiilty. For optimum results I prefer to use lower alkyl radicals and aryl radicals.

For a better understanding of my invention reference should be had to the following examples which illustrate but do not limit the scope of my invention.

Example No. 1

A small glass plate was treated with a dilute solution of phenylsilicon trichloride in benzene and then rinsed with pure benzene. A piece of glass fibre tape was then cemented to the treated glass surface with polymethylmethacrylate. The shearing stress required to tear the tape loose from the plate was measured and found to be 2.6 kg. per sq. cm. A similar sample after immersion for thirty minutes in boiling water required 3 kg. per sq. cm. In comparison, another plate on which the glass tape was cemented directly to the glass without any preliminary treatment thereof required a shearing stress of .7 kg. per sq. cm., and with a similar sample after thirty minutes immersion in boiling water the glass tape spontaneously separated from the glass plate.

Example No. 2

Plates of glass were dipped in a 1% solution of phenylsilicon trichloride in benzene, then rinsed with benzene and baked for one hour at 150° C. A lacquer composed of ethyl cellulose and manila gum was applied to the treated plates which were again baked for one hour at 150° C. The plates were then immersed in water. The lacquer coating did not become loosened until after forty-five days immersion. In similar comparative samples which had no initial treatment with phenylsilicon trichloride, the lacquer peeled away from the glass after nine days immersion in water.

Example No. 3

Polystyrene was dissolved in benzene and the solution was applied to a glass plate which was then baked for one hour at 150° C. The resinous coating was removed by fourteen days immersion in water. Another plate was first primed, as in Example 2, with phenylsilicon trichloride, and was then coated in like manner with polystyrene and baked. Twenty-four days immersion in water was required to loosen the resin from the latter plate.

Example No. 4

Polymeric methyl methacrylate was applied as a solution in dioxan to a glass plate and baked one hour at 150° C. to form a resin which peeled away from an unprimed glass surface after an immersion of one day in water, but which did not peel away from a glass surface which had been primed with phenylsilicon trichloride until after eleven days immersion in water.

Example No. 5

A cellulose nitrate lacquer came free from unprimed glass after eight days in water but was still adhering well after forty-five days in water to a glass surface which had first been primed as in Example 2 with phenylsilicon trichloride.

Example No. 6

Ethyl cellulose applied to a glass plate as a solution in isopropyl alcohol and baked one hour at 150° C. came free from the unprimed glass after one day in water, but with glass which was first primed as in Example 2 with phenylsilicon trichloride, failure occurred only after twenty-one days.

Example No. 7

Cellulose acetate was dissolved in acetone applied to glass plates and baked one hour at 150° C. When the plates were immersed in distilled water the resinous coating came free from unprimed glass after one day's immersion, but with glass which had first been primed as in Example 2 with phenylsilicon trichloride, failure occurred only after three days.

Example No. 8

Polymeric propyl methacrylate dissolved in benzene, applied to glass plates and baked for one hour at 150° C., lost its adhesion to an unprimed glass plate after three days immersion in water, but it was still adhering after forty-five days immersion to a glass plate which had first been primed with phenylsilicon trichloride, as in Example 2.

Example No. 9

A copolymeric mixture of vinyl acetate and vinyl chloride dissolved in a mixture of benzene and dioxan was applied to primed and unprimed glass plates and baked for one hour at 150° C. The resinous coating came free from unprimed glass after seven days immersion in water, but was still adhering after forty-eight days immersion when the glass had first been primed with phenylsilicon trichloride, as in Example 2.

Example No. 10

A drying oil varnish, was applied to plates of borosilicate glass and heated for one hour at 200° C. Some of the plates had first been primed by treating with a solution of phenylsilicon trichloride in benzene and then rinsing the glass with benzene. The plates were immersed in water, heated at 95° C. In 18 hours the varnish was free from the unprimed glass but still had good adhesion about 96 hours to the primed glass.

Example No. 11

A glass beaker was fortified, that is, strengthened, by being immersed in a dilute solution of hydrofluoric acid until the surface layer of the glass was dissolved away and all surface flaws thereby eliminated. The beaker was thereafter rinsed and dried and then was treated with a 1% solution of phenylsilicon trichloride in benzene, after which it was rinsed with pure benzene and again dried. The primed surface was then coated with a drying oil varnish and baked for one hour at about 150° C. The coated beaker was then placed in an autoclave for seventy minutes at 125° C. in saturated steam. At the end of this time the lacquer was still strongly adherent and the beaker could be dropped from the table height to the floor without breaking.

Example No. 12

Equal parts by weight of phenyl ethyl silicone and finely-grounded foliated glass which was first primed with phenylsilicon trichloride were dispersed in benzene in the ratio of 1 gram of the mixture of 2 cc. benzene. It was found that the dispersion of the foliated glass in the organic medium was improved by its initial priming with phenylsilicon trichloride. The mixture was applied by spraying to a coil of No. 38 copper wire wound directly in contact with the porcelain tube. The coating was air-dried two hours at room temperature, then baked one hour at 150° C. and, finally, baked one hour at 250° C. On winding a second coil of wire over this coating, leakage was found to occur at 20 volts. The second coil was removed and a second coat sprayed onto the first coil. The drying and baking schedule given above was repeated. Breakdown at 84 volts occurred. A third coat was applied and in this case the final baking was one hour at 270° C. At room temperature the insulation has withstood a hundred volts applied between the coils.

I claim:

1. The method of coating a siliceous base member which comprises priming the surface of the base member with a composition comprising phenylsilicon trichloride and thereafter applying to the primed surface a solution of resinous coating and thereafter drying the coated base.

2. The method of coating a siliceous base member which comprises priming the surface of the base member with phenylsilicon trichloride and thereafter applying a solution of resinous polymethylmethacrylate to the primed surface and thereafter drying the coated base.

OSCAR KENNETH JOHANNSON.

REFERENCES CITED

The following references are of record in the file of this patent:

UNITED STATES PATENTS

| Number | Name | Date |
| --- | --- | --- |
| 2,215,048 | McGregor et al. | Sept. 17, 1940 |
| 2,258,218 | Rochow | Oct. 7, 1941 |
| 2,258,222 | Rochow | Oct. 7, 1941 |
| 2,286,767 | Shutt | June 16, 1942 |
| 2,306,222 | Patnode | Dec. 22, 1942 |
| 2,390,370 | Hyde | Dec. 4, 1945 |